United States Patent
Liu et al.

(10) Patent No.: US 11,729,846 B2
(45) Date of Patent: Aug. 15, 2023

(54) METHOD FOR ACTIVATING PACKET DATA CONVERGENCE PROTOCOL DUPLICATION AND NODE DEVICE

(71) Applicant: CHINA ACADEMY OF TELECOMMUNICATIONS TECHNOLOGY, Beijing (CN)

(72) Inventors: Aijuan Liu, Beijing (CN); Jing Liang, Beijing (CN); Jiamin Liu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 50 days.

(21) Appl. No.: 16/967,669

(22) PCT Filed: Feb. 1, 2019

(86) PCT No.: PCT/CN2019/074403
§ 371 (c)(1),
(2) Date: Aug. 5, 2020

(87) PCT Pub. No.: WO2019/154317
PCT Pub. Date: Aug. 15, 2019

(65) Prior Publication Data
US 2021/0227606 A1 Jul. 22, 2021

(30) Foreign Application Priority Data
Feb. 9, 2018 (CN) .......................... 201810133812.1

(51) Int. Cl.
*H04W 56/00* (2009.01)
*H04W 76/15* (2018.01)
(Continued)

(52) U.S. Cl.
CPC .......... *H04W 76/15* (2018.02); *H04L 5/0032* (2013.01); *H04L 69/18* (2013.01); *H04W 76/11* (2018.02); *H04W 80/02* (2013.01)

(58) Field of Classification Search
CPC ..... H04W 76/15; H04W 76/11; H04W 80/02; H04L 5/0032; H04L 69/18
(Continued)

(56) References Cited

U.S. PATENT DOCUMENTS

2005/0026616 A1* 2/2005 Cavalli ............. H04W 36/0085
455/439
2018/0324642 A1* 11/2018 Yu ......................... H04L 5/0053
(Continued)

FOREIGN PATENT DOCUMENTS

CN 107241164 A 10/2017
CN 107342851 A 11/2017
(Continued)

OTHER PUBLICATIONS

"Consideration on the activation/deactivation of data duplication for CA", R2-1704660, 3GPP TSG-RAN WG2 Meeting #98, Hangzhou, China, May 15-19, 2017.
(Continued)

*Primary Examiner* — Sai Ming Chan
(74) *Attorney, Agent, or Firm* — Ladas & Parry, LLP

(57) ABSTRACT

The present disclosure provides a method for activating a packet data convergence protocol (PDCP) duplication and a node device. The method includes: receiving, by a second node, a notification message transmitted by a first node when the first node configures a PDCP duplication for a bearer; after the second node receives the notification message, changing or determining, by the second node, an activation or deactivation state of uplink (UL) PDCP duplication of the bearer.

17 Claims, 3 Drawing Sheets

(51) Int. Cl.
  *H04W 76/11* (2018.01)
  *H04L 5/00* (2006.01)
  *H04L 69/18* (2022.01)
  *H04W 80/02* (2009.01)

(58) Field of Classification Search
  USPC .......................................................... 370/329
  See application file for complete search history.

(56) References Cited

U.S. PATENT DOCUMENTS

| | | | |
|---|---|---|---|
| 2019/0098533 A1* | 3/2019 | Babaei | H04W 72/0413 |
| 2019/0098682 A1* | 3/2019 | Park | H04L 1/08 |
| 2019/0327641 A1* | 10/2019 | Mok | H04W 76/27 |
| 2020/0187297 A1* | 6/2020 | Jiang | H04W 28/06 |
| 2020/0382240 A1* | 12/2020 | Centonza | H04W 76/12 |

FOREIGN PATENT DOCUMENTS

| | | |
|---|---|---|
| EP | 3512140 A1 | 7/2019 |
| EP | 3641188 A1 | 4/2020 |
| EP | 3737014 A1 | 11/2020 |

OTHER PUBLICATIONS

"Email discussion summary on control of UL PDCP duplication", R2-1704834, 3GPP TSG-RAN WG2 Meeting #98, Hangzhou, China, May 15-19, 2017.
"PDCP duplication for CU-DU", R3-173128, 3GPP TSG RAN WG3 meeting #97, Berlin, Germany, Aug. 21-25, 2017.
"Discussion on CA based PDCP Duplication", R3-173593, 3GPP TSG-RAN WG3 Meeting #97bis, Prague, Czech Republic, Oct. 9-13, 2017.
"Discussion on CA based PDCP Duplication", R3-174533, 3GPP TSG-RAN WG3#98, Reno, NV, USA, Nov. 27-Dec. 1, 2017.
International Search Report from PCT/CN2019/074403, dated Apr. 28, 2019, with English translation from WIPO.
Written Opinion of the International Searching Authority from PCT/CN2019/074403, dated Apr. 28, 2019, with English translation from WIPO.
International Preliminary Report on Patentability from PCT/CN2019/074403, dated Aug. 11, 2020, with English translation from WIPO.
Notification of Reasons for Refusal from KR app. No. 10-2020-7025703, dated May 14, 2021, with English translation from Global Dossier.
"Consideration on the activation or deactivation of duplication", R3-174408, 3GPP TSG-RAN WG3 #98, Reno, NV, USA. Nov. 27-Dec. 1, 2017.
Second European Office Action for European Patent Application 19751843.4 dated May 2, 2022.
"Activation and Deactivation of UL PDCP duplication," 3GPP TSG-RAN WG2 #98, R2-1705266, Hangzhou, China, May 15-19, 2017, Agenda Item: 10.2.2 User Plane, Source: NEC, all pages.
"Configuration and control of packet duplication," 3GPP TSG RAN WG2 NR Ad Hoc, R2-1706716, Qingdao, China, Jun. 27-29, 2017, Agenda Item: 10.2.2.4, Source: Huawei, HiSilicon, all pges.
European Office Action for corresponding European Patent Application 19751843.4 dated Feb. 17, 2023.

* cited by examiner

METHOD FOR ACTIVATING PACKET DATA CONVERGENCE PROTOCOL DUPLICATION AND NODE DEVICE

CROSS-REFERENCE TO RELATED APPLICATIONS

This application is the U.S. national phase of PCT Application PCT/CN2019/074403 filed on Feb. 1, 2019, which claims the benefit of and priority to Chinese Application No. 201810133812.1, filed on Feb. 9, 2018, the disclosures of which are incorporated herein by reference in their entireties.

TECHNICAL FIELD

The present disclosure relates to the field of communication technologies, and in particular to a method for activating a packet data convergence protocol (PDCP) duplication and a node device.

BACKGROUND

In the long term evolution (LTE) system, the UMTS terrestrial radio access network (E-UTRAN) is composed of multiple Evolution Node Bs (eNodeBs). The eNodeB is connected to the evolved packet core network (EPC) through the Si interface, and the eNodeBs are connected through the X2 interface.

In the 5G system, it is considered to introduce a central unit (CU) for centralized control and scheduling. Functions of radio resource control (RRC) and some functions of Layer 2 and/or Layer 1 are in the central unit, and other functions of a base station are deployed on a distribute unit (DU).

The interface (NG) between the base station and the core network is terminated at the CU, and the interface (Xn) between the base stations is also terminated at the CU.

(1) CU/DU Split at the Radio Access Network (RAN) Side

As shown in FIG. 1, CU/DU split at the RAN side is divided into higher-layer split and lower-layer split. The higher-layer split scheme is that radio resource control (RRC) and packet data convergence protocol (PDCP) are in CU, radio link control (RLC), media access control (MAC), physical layer and RF are in DU.

For control plane signaling, in the CU, an RRC message is mapped into a corresponding PDCP protocol data unit (PDU) through a PDCP layer, then the PDCP PDU data stream is included an interface AP message of the CU/DU in form of a container and then is transmitted through the control plane. The DU distributes the data stream to corresponding entities in the layer 2, which continue to process the data and transmit it to a user equipment (UE). Since the control plane adopts the stream control transmission protocol (SCTP) protocol stack, the reliability of data transmission is guaranteed.

For user plane data, a dedicated user plane tunnel is established between the CU and the DU for each data radio bearer (DRB). The CU transfers data corresponding to the DRB, after being processed by PDCP, to the DU through the corresponding tunnel.

(2) Carrier Aggregation (CA) Based PDCP Duplication

In order to support reliable data transmission, NR introduces PDCP duplication based on CA and double connection (DC).

As shown in FIG. 2, CA-based PDCP duplication is to transmit a PDCP data packet to two radio link control (RLC) entities located under the same node.

For the scenario where the PDCP and the RLC are located at the same node, data transmission between the PDCP layer and the RLC layer is implemented internally.

However, for the CU/DU split scenario, the DRB and the PDCP PDU corresponding to signaling radio bearer (SRB) are transferred between the CU and the DU.

How to activate uplink (UL) PDCP duplication requires standard support when configuring PDCP duplication of bearers.

(3) Double Connection (DC) Based PDCP Duplication

As shown in FIG. 3, DC-based PDCP duplication is to transmit a PDCP packet to two RLC entities located under two nodes. In case of the DC-based PDCP duplication, MAC can activate UL PDCP duplication of a bearer. When initially configuring PDCP duplication of a bearer, how to activate UL PDCP duplication requires consideration of standard support.

Currently, in the CU/DU split scenario, there is no complete solution about how to activate UL duplication while configuring the bearer to support CA-based duplication.

Meanwhile, in multi-RAT double connection (MR-DC) scenario, there is no complete solution about how to activate UL duplication while configuring the bearer to support DC-based duplication.

SUMMARY

Embodiments of the present disclosure provide a method for activating a packet data convergence protocol (PDCP) duplication and a node device, which can indicate whether UL duplication of a bearer is activated or deactivated when configuring PDCP duplication for the bearer.

In order to solve the above technical problems, the embodiments of the present disclosure provide the following technical solutions.

A method for activating a packet data convergence protocol (PDCP) duplication, including:

receiving, by a second node, a notification message transmitted by a first node when the first node configures a PDCP duplication for a bearer;

after the second node receives the notification message, changing or determining, by the second node, an activation or deactivation state of uplink (UL) PDCP duplication of the bearer.

Optionally, the notification message carries indication information of configuring the bearer with the PDCP duplication and activation/deactivation of UL PDCP duplication of the bearer.

Optionally, after the second node receives the notification message, changing or determining, by the second node, an activation or deactivation state of uplink (UL) PDCP duplication of the bearer, includes:

after the second node receives the indication information of activation/deactivation of UL PDCP duplication of the bearer carried in the notification message, changing, by the second node, an activation/deactivation state of UL PDCP duplication of the bearer.

Optionally, the changing, by the second node, an activation/deactivation state of UL PDCP duplication of the bearer, includes:

changing, by the second node, an activation/deactivation state of UL of the bearer through medium access control control unit (MAC CE) signaling.

Optionally, after the second node receives the indication information of activation of UL PDCP duplication of the bearer carried in the notification message, or after the second node changes the deactivation state of UL of the bearer to be the activation state, the method further includes:

providing, by the second node, a service of a corresponding priority to the bearer, according to the activation state of UL of the bearer.

Optionally, the notification message carries indication information of configuring the bearer with the PDCP duplication;

wherein after the second node receives the notification message, determining, by the second node, an activation or deactivation state of uplink (UL) PDCP duplication of the bearer, includes:

after the second node receives the notification message, when determining to activate UL PDCP duplication of the bearer, transmitting, by the second node, a response message to the first node; wherein the response message carries indication information of activating UL PDCP duplication of the bearer.

Optionally, for carrier aggregation (CA) based PDCP duplication, in a central unit (CU)/distribute unit (DU) split scenario, when the first node is the CU, the second node is the DU; or, for double connection (DC) based PDCP duplication, when the first node is a master node (MN), the second node is a secondary node (SN).

One embodiment of the present disclosure further provides a method for activating a packet data convergence protocol (PDCP) duplication, including:

transmitting, by a first node, a notification message to a second node when the first node configures PDCP duplication for a bearer, so that after the second node receives the notification message, the second node changes or determines an activation or deactivation state of uplink (UL) PDCP duplication of the bearer.

Optionally, the first node configures PDCP duplication for the bearer according to auxiliary information reported by the second node.

The auxiliary information includes at least one of the following: whether the second node supports a carrier aggregation (CA) scenario, whether the second node supports an ultra-reliable low latency communication (URLLC) service, and situation information of a channel currently supported by the second node.

Optionally, the notification message carries indication information of configuring the bearer with the PDCP duplication and activation/deactivation of UL PDCP duplication of the bearer.

Optionally, the notification message carries indication information of configuring the bearer with the PDCP duplication;

after the transmitting, by a first node, a notification message to a second node, the method further includes:

receiving a response message that is transmitted by the second node when the second node determines to activate UL PDCP duplication of the bearer according to the notification message; wherein the response message carries indication information of activating UL PDCP duplication of the bearer.

Optionally, for carrier aggregation (CA) based PDCP duplication, in a central unit (CU)/distribute unit (DU) split scenario, when the first node is the CU, the second node is the DU; or, for double connection (DC) based PDCP duplication, when the first node is a master node (MN), the second node is a secondary node (SN).

One embodiment of the present disclosure further provides a node device, including:

a transceiver, a memory, a processor, and a computer program stored on the memory and executable on the processor;

wherein the transceiver is configured to receive a notification message transmitted by a first node when the first node configures a PDCP duplication for a bearer;

the processor is configured to, after receiving the notification message, change or determine an activation or deactivation state of uplink (UL) PDCP duplication of the bearer.

Optionally, the notification message carries indication information of configuring the bearer with the PDCP duplication and activation/deactivation of UL PDCP duplication of the bearer;

after the transceiver receives the indication information of activation/deactivation of UL PDCP duplication of the bearer carried in the notification message, the processor changes an activation/deactivation state of UL PDCP duplication of the bearer;

the transceiver is further configured to change an activation/deactivation state of UL of the bearer through medium access control control unit (MAC CE) signaling;

the processor is further configured to provide a service of a corresponding priority to the bearer, according to the activation state of UL of the bearer.

Optionally, the notification message carries indication information of configuring the bearer with the PDCP duplication;

after receiving the notification message, when the transceiver determines to activate UL PDCP duplication of the bearer, the transceiver transmits a response message to the first node; wherein the response message carries indication information of activating UL PDCP duplication of the bearer.

Optionally, for carrier aggregation (CA) based PDCP duplication, in a central unit (CU)/distribute unit (DU) split scenario, when the first node is the CU, the second node is the DU; or, for double connection (DC) based PDCP duplication, when the first node is a master node (MN), the second node is a secondary node (SN).

One embodiment of the present disclosure further provides a node device, including:

a transceiver, a memory, a processor, and a computer program stored on the memory and executable on the processor;

wherein the transceiver is configured to transmit a notification message to a second node when configuring PDCP duplication for a bearer, so that after the second node receives the notification message, the second node changes or determines an activation or deactivation state of uplink (UL) PDCP duplication of the bearer.

Optionally, the transceiver configures PDCP duplication for the bearer according to auxiliary information reported by the second node.

Optionally, the auxiliary information includes at least one of the following: whether the second node supports a carrier aggregation (CA) scenario, whether the second node supports an ultra-reliable low latency communication (URLLC) service, and situation information of a channel currently supported by the second node.

Optionally, the notification message carries indication information of configuring the bearer with the PDCP duplication and activation/deactivation of UL PDCP duplication of the bearer.

Optionally, the notification message carries indication information of configuring the bearer with the PDCP duplication;

the transceiver is further configured to receive a response message that is transmitted by the second node when the second node determines to activate the UL PDCP duplication of the bearer according to the notification message; wherein the response message carries indication information of activating UL PDCP duplication of the bearer.

Optionally, for carrier aggregation (CA) based PDCP duplication, in a central unit (CU)/distribute unit (DU) split scenario, when the first node is the CU, the second node is the DU; or, for double connection (DC) based PDCP duplication, when the first node is a master node (MN), the second node is a secondary node (SN).

One embodiment of the present disclosure further provides a packet data convergence protocol (PDCP) duplication activation device, including:

a transceiver module configured to receive a notification message transmitted by a first node when the first node configures a PDCP duplication for a bearer;

a processing module configured to, after receiving the notification message, change or determine an activation or deactivation state of uplink (UL) PDCP duplication of the bearer.

One embodiment of the present disclosure further provides a packet data convergence protocol (PDCP) duplication activation device, including:

a transceiver module configured to transmit a notification message to a second node when configuring PDCP duplication for a bearer, so that after the second node receives the notification message, the second node changes or determines an activation or deactivation state of uplink (UL) PDCP duplication of the bearer.

One embodiment of the present disclosure further provides a computer storage medium including instructions; wherein the instructions are executed by a computer to cause the computer to perform the above method.

The beneficial effects of the embodiments of the present disclosure are as follows.

In the foregoing embodiments of the present disclosure, the second node receives the notification message transmitted by the first node when the first node configures PDCP duplication for a bearer; the second node activates uplink (UL) PDCP duplication of the bearer according to the notification message. In the scenario of CA-based PDCP duplication and CU/DU split, the first node is a central unit (CU), the second node is a distribute unit (DU). The embodiment of the present disclosure teaches how to indicate a current state (i.e., activation or deactivation) of the UL PDCP duplication and subsequent behaviors of the DU when configuring the CA-based PDCP duplication. Meanwhile, in the MR-DC scenario, the first node is a master node (MN), and the second node is a secondary node (SN). The embodiment of the present disclosure teaches how to indicate a state of the UL PDCP duplication of the bearer, i.e., activated or deactivated, and subsequent behaviors of the SN, when configuring the DC-based PDCP duplication.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Exemplary embodiments of the present disclosure will be described in detail hereinafter with reference to the accompanying drawings. Although exemplary embodiments of the present disclosure are shown in the accompanying drawings, it should be understood that the disclosure may be implemented in various forms and should not be limited by the embodiments described herein. On the contrary, these embodiments are provided in order to understand the disclosure more thoroughly and to convey the scope of the disclosure to those skilled in the art.

In one embodiment of the present disclosure, when configuring PDCP duplication for a bearer, activation/deactivation of UL duplication of the bearer is configured, thereby providing a configuration scheme for activation/deactivation of UL duplication of the bearer.

Figure 1:
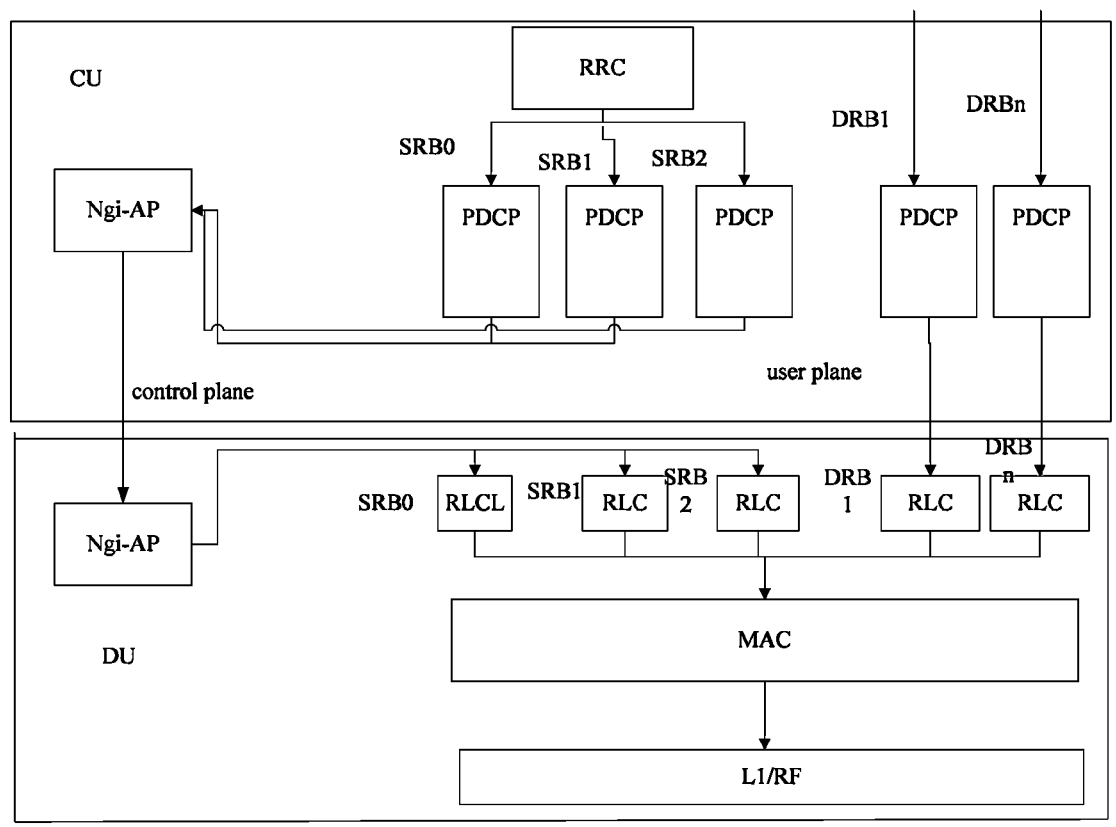
FIG. 1 is a schematic diagram of a CU/DU split architecture.
Figure 2:
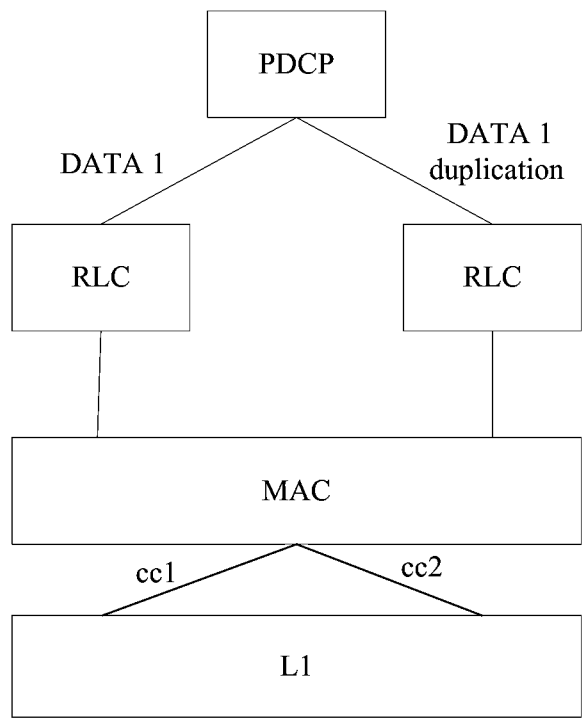
FIG. 2 shows a PDCP duplication based on CA and DC.
Figure 3:
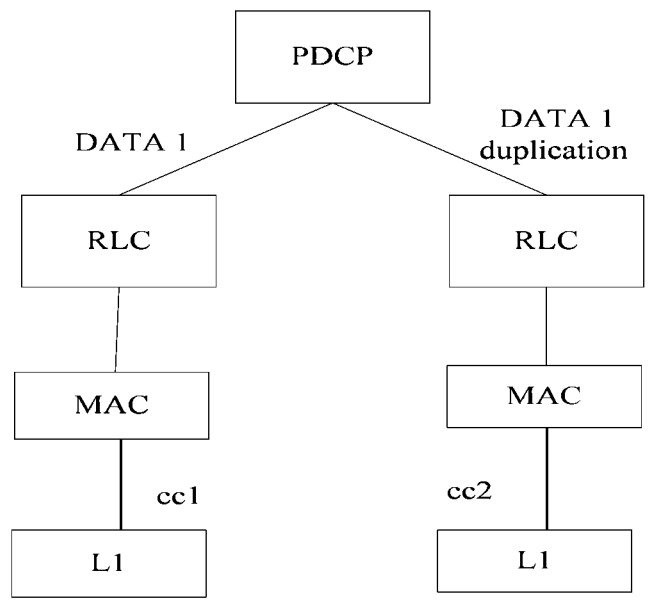
FIG. 3 shows a DC-based PDCP duplication.
Figure 4:
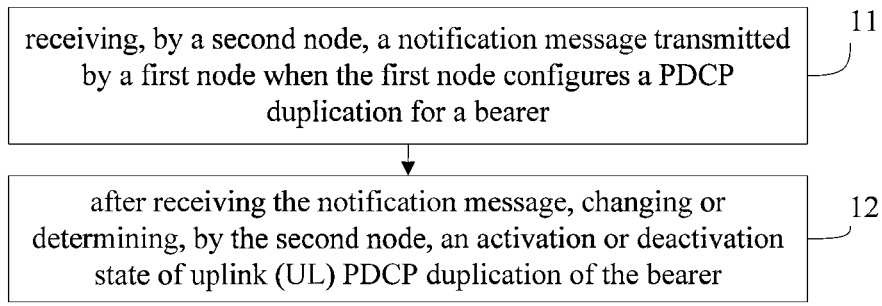
FIG. 4 is a flow chart of a method for activating a packet data convergence protocol (PDCP) duplication according to an embodiment of the present disclosure.

As shown in FIG. 4, one embodiment of the present disclosure provides a method for activating a packet data convergence protocol (PDCP) duplication, including:

Step 11: receiving, by a second node, a notification message transmitted by a first node when the first node configures a PDCP duplication for a bearer;

Step 12: after receiving the notification message, changing or determining, by the second node, an activation or deactivation state of uplink (UL) PDCP duplication of the bearer.

In one embodiment, in the scenario of CA-based PDCP duplication and CU/DU split, when the first node is a central unit (CU), the second node is a distribute unit (DU).

According to DC-based PDCP duplication, when the first node is a master node (MN), the second node is a secondary node (SN).

In one embodiment, the second node receives the notification message transmitted by the first node when the first node configures the PDCP duplication for a bearer; and after the second node receives the notification message, the second node changes or determines an activation or deactivation state of UL PDCP duplication of the bearer. In this way, when configuring the PDCP duplication for the bearer, activation/deactivation of UL duplication of the bearer is configured, thereby filling gaps in the related art.

A first implementation of the embodiment shown in FIG. 4

Step 111: receiving, by a second node, a notification message transmitted by a first node when the first node configures a PDCP duplication for a bearer; where the notification message carries indication information of configuring the bearer with the PDCP duplication and activation/deactivation of UL PDCP duplication of the bearer.

Step 121: after receiving the indication information of activation/deactivation of UL PDCP duplication of the bearer carried in the notification message, changing, by the second node, an activation/deactivation state of UL PDCP duplication of the bearer.

The changing, by the second node, an activation/deactivation state of UL PDCP duplication of the bearer, includes: changing, by the second node, an activation/deactivation state of UL of the bearer through medium access control control unit (MAC CE) signaling.

Further, after the second node receives the indication information of activation of UL PDCP duplication of the bearer carried in the notification message, or after the second node changes the deactivation state of UL of the bearer to be the activation state, the method further includes:

Step 131: providing, by the second node, a service of a corresponding priority to the bearer, according to the activation state of UL of the bearer.

For the CA-based PDCP duplication, in the CU/DU split scenario, when the CU configures PDCP duplication for a bearer, the CU notifies the DU that the UL duplication of the bearer is activation/deactivation state, according to auxiliary information reported by the DU. After the DU receives that the CU configures the PDCP duplication for the bearer and the UL duplication of the bearer is the activation/deactivation state, the DU can change the activation/deactivation state of the bearer through MAC signaling, specifically MAC CE signaling, and provides a service of a corresponding priority to the bearer according to the activation state.

In a specific implementation, a connected UE accesses a gNB of a CU/DU split architecture, and the UE requests to initiate an ultra-reliable low latency communication (URLLC) service. Based on indication of the core network, according to auxiliary information of the DU, the CU establishes a bearer-related context that supports URLLC services in the DU, through a UE context modification request message which carries an indication that the bearer supports the PDCP duplication and the activation/deactivation state of the UL PDCP duplication of the bearer. The method includes the following steps.

Step 1: requesting, by the core network, the radio access network (RAN) to establish a bearer corresponding to the URLLC service.

Step 2: based on the auxiliary information previously provided the DU, such as whether the DU supports the CA, whether the DU supports the URLLC service and current channel condition, transmitting, by the CU, a UE context modification request message to the DU. This message notifies the DU to establish a bearer supporting the PDCP duplication. Meanwhile, the CU notifies the DU that the UL duplication has been activated. Further, the CU may directly transmit to the UE state information that the bearer supports the PDCP duplication and the UL duplication of the bearer has been activated/deactivated.

Step 3: after the DU receives the message and then learns that the bearer supports the PDCP duplication and the UL duplication has been activated, considering, by the DU, that the UE needs to be processed with high priority. Subsequently, the DU may determine whether to perform activation/deactivation of the UL duplication according to the network condition. The DU responds to the request of the CU through a UE Context modification response message. Further, after the DU changes the activation/deactivation state of the UL duplication of the bearer, the DU may also notify the UE of the changed activation/deactivation state of the UL duplication of the bearer.

Step 4: initiating, by the CU, an RRC connection reconfiguration procedure to the UE.

For the DC-based PDCP duplication, according to auxiliary information reported by a secondary node (SN), when a master node (MN) notifies the SN to configure a duplication for a bearer, the MN simultaneously notifies the SN that UL duplication of the bearer is an activation/deactivation state. Subsequently, the SN can change the activation/deactivation state of the bearer through MAC signaling, and provide a service of a corresponding priority to the bearer, according to the activation state.

In a specific implementation, the UE simultaneously accesses both LTE and NR, and the UE requests to initiate a URLLC service. Based on indication of the core network, according to auxiliary information of the SN, a split bear related context that supports the URLLC service is established in the SN through an SgNB modification request message, which carries an indication that the bearer supports the PDCP duplication and the activation/deactivation state of the UL PDCP duplication of the bearer. The method includes the following steps.

Step 1: requesting, by the core network, the radio access network (RAN) to establish a bearer corresponding to the URLLC service.

Step 2: based on the auxiliary information of the SN, such as whether to support the URLLC service, current channel situation, transmitting, by the MN, to the SN, an SgNB modification request message. This message notifies the SN to establish a split bearer supporting the duplication. Meanwhile, the MN notifies the SN that the UL duplication has been activated. Further, the MN may directly transmit to the UE state information that the bearer supports the PDCP duplication and the UL duplication of the bearer has been activated/deactivated.

Step 3: after the SN receives the message and then learns that the bearer supports the duplication and the UL duplication has been activated, considering, by the SN, that the UE needs to be processed with high priority. Subsequently, the SN may determine whether to perform activation/deactivation of the UL duplication according to the network condition. The SN responds to the request of the MN through an SgNB modification response message. Further, after the SN changes the activation/deactivation state of the UL duplication of the bearer, the SN may also notify the UE of the changed activation/deactivation state of the UL duplication of the bearer.

Step 4: initiating, by the MN, an RRC connection reconfiguration procedure to the UE.

A second implementation of the embodiment shown in FIG. 4

Step 112: receiving, by a second node, a notification message transmitted by a first node when the first node configures a PDCP duplication for a bearer; where the notification message carries indication information of configuring the bearer with the PDCP duplication.

Step 122: after the second node receives the notification message, when determining to activate UL PDCP duplication of the bearer, transmitting, by the second node, a response message to the first node; where the response message carries indication information of activating UL PDCP duplication of the bearer.

For the CA-based PDCP duplication, in the CU/DU split scenario, the CU only notifies the DU that a bearer is configured with the duplication. The DU determines that the bearer currently needs to activate the UL duplication, and then transmits to the CU a response message which carries the indication information of activating UL duplication of the bearer. The CU notifies the UE of a bearer configured with the duplication and activation of UL duplication of the bearer through an RRC message.

In a specific implementation, a connected UE accesses a gNB of a CU/DU split architecture, and the UE requests to initiate an URLLC service. Based on indication of the core network, the CU establishes a bearer-related context that supports the URLLC services in the DU, through a UE context modification request message. The DU considers that the bearer currently needs to activate the UL duplication. The UE context modification request message carries an activation/deactivation state of PDCP duplication. The method includes the following steps.

Step 1: requesting, by the core network, the radio access network (RAN) to establish a bearer corresponding to the URLLC service.

Step 2: transmitting, by the CU, a UE context modification request message to the DU, where the message notifies the DU to establish a bearer supporting the duplication.

Step 3: after the DU receives the message and then learns that the bearer supports the PDCP duplication, when the DU determines that the bearer currently needs to activate the UL duplication according to current radio condition, instructing, by the DU, the CU to activate the UL duplication through a UE Context modification response message. Further, after the DU determines the activation/deactivation state of the UL duplication of the bearer, the DU may also notify the UE of the activation/deactivation state of the UL duplication of the bearer.

Step 4: according to information in the received UE Context modification response message, initiating, by the CU, an RRC Connection reconfiguration procedure to the UE.

For the DC-based PDCP duplication, the MN only notifies the SN that a bearer is configured with the duplication. The SN determines that the bearer currently needs to activate the UL duplication, and then transmits to the MN a response message which carries indication information of activating UL duplication. The MN notifies the UE of a bearer configured with the duplication and activation of UL duplication of the bearer through an RRC message.

In a specific implementation, the UE simultaneously accesses both LTE and NR, and the UE requests to initiate a URLLC service. Based on indication of the core network, the MN establishes a split bear related context that supports the URLLC service in the SN through an SgNB modification request message, which carries an indication that the bearer supports the PDCP duplication. When the SN determines that the bearer currently needs to activate the UL duplication, the SgNB modification request message carries an activation/deactivation state of the PDCP duplication. The method includes the following steps.

Step 1: requesting, by the core network, the radio access network (RAN) to establish a bearer corresponding to the URLLC service.

Step 2: transmitting, by the MN, to the SN, an SgNB modification request message; where this message notifies the SN to establish a split bearer supporting the duplication.

Step 3: after the SN receives the message and then learns that the bearer supports the duplication, when the SN determines that UL duplication needs to be activated according to current radio condition, instructing, by the SN, the MN to activate the UL duplication through an SgNB modification response message. Further, after the SN determines the activation/deactivation state of the UL duplication of the bearer, the SN may also notify the UE of the activation/deactivation state of the UL duplication of the bearer.

Step 4: according to information in the received SgNB modification response message, initiating, by the MN, an RRC Connection reconfiguration procedure to the UE.

In the foregoing embodiment of the present disclosure, for the CA-based PDCP duplication, in the CU/DU split scenario, the following two methods are provided to activate/deactivate the UL duplication when configuring the bearer duplication.

Method 1: according to auxiliary information reported by the DU, when the CU configures the duplication for a bearer, the CU notifies the DU of activation/deactivation state of UL duplication of the bearer; subsequently, the DU can change the activation/deactivation state of the bearer through MAC signaling, and provide a service of a corresponding priority to the bearer, according to the activation state.

Method 2: the CU only notifies the DU that a bearer is configured with the duplication. The DU determines that the bearer currently needs to activate the UL duplication, and then transmits to the CU a response message which carries indication information of activating UL duplication. The CU notifies the UE of a bearer configured with the duplication and activation of UL duplication of the bearer through an RRC message.

The present disclosure teaches how to indicate a current state (i.e., activation or deactivation) of the PDCP duplication and subsequent behaviors of the DU when configuring the CA-based PDCP duplication in the CU/DU split scenario. Meanwhile, using methods similar to the above methods 1 and 2, it also taches how to indicate a current state of the PDCP duplication, i.e., activated or deactivated, and subsequent behaviors of the DU, when configuring the DC-based PDCP duplication in the MR-DC scenario.

Figure 5:
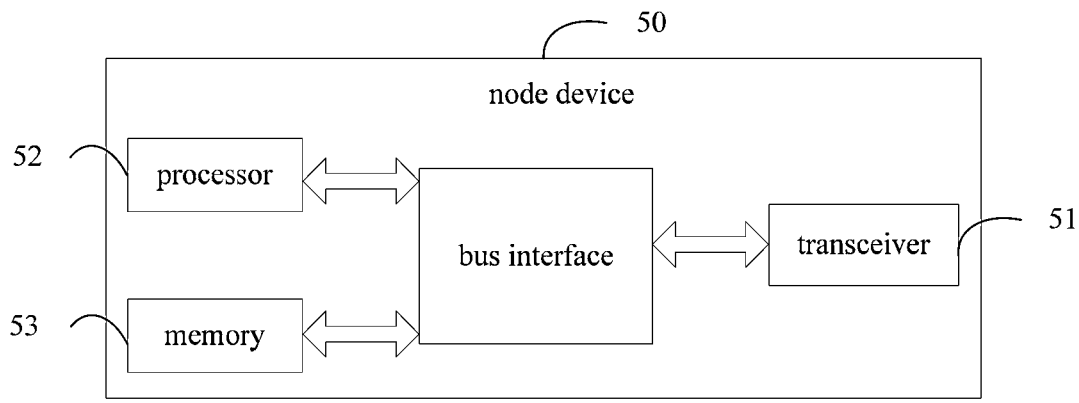
FIG. 5 is a block diagram of a node device according to an embodiment of the present disclosure.

As shown in FIG. 5, one embodiment of the present disclosure further provides a node device 50, including:

a transceiver 51 configured to receive a notification message transmitted by a first node when the first node configures a PDCP duplication for a bearer;

a processor 52 configured to, after receiving the notification message, change or determine an activation or deactivation state of uplink (UL) PDCP duplication of the bearer.

In one embodiment, the transceiver and the processor may be communicably connected through a bus or an interface. The node device may further include a memory 53 for storing corresponding data of the transceiver or the processor in processing data. The memory, the transceiver and processor may be communicatively connected through a bus or an interface.

In a specific embodiment of the present disclosure, in the scenario of CA-based PDCP duplication and CU/DU split, when the first node is a central unit (CU), the second node is a distribute unit (DU). The notification message carries indication information of configuring the bearer with the PDCP duplication and activation/deactivation of UL PDCP duplication of the bearer.

Further, after the transceiver receives the indication information of activation/deactivation of UL PDCP duplication of the bearer carried in the notification message, the processor changes an activation/deactivation state of UL PDCP duplication of the bearer.

Further, the transceiver is further configured to change an activation/deactivation state of UL of the bearer through medium access control control unit (MAC CE) signaling.

Further, the processor is further configured to provide a service of a corresponding priority to the bearer, according to the activation state of UL of the bearer.

In a specific embodiment of the present disclosure, according to DC-based PDCP duplication, when the first node is a master node (MN), the second node is a secondary node (SN). The notification message carries indication information of configuring the bearer with the PDCP duplication.

Further, after receiving the notification message, when the transceiver determines to activate UL PDCP duplication of the bearer, the transceiver transmits a response message to the first node; where the response message carries indication information of activating UL PDCP duplication of the bearer. This embodiment refers to a device of the second node corresponding to the method at the second node, and all implementations of the method at the second node are applicable to the embodiment, and the same technical effects can be achieved.

One embodiment of the present disclosure further provides a node device, including:

a transceiver configured to transmit a notification message to a second node when configuring PDCP duplication for a bearer, so that after the second node receives the notification message, the second node changes or determines an activation or deactivation state of uplink (UL) PDCP duplication of the bearer.

In one embodiment, the node device may further include a processor that processes data, and a memory that stores data. The processor and the memory may be communicably connected to the transceiver through a bus or an interface.

In a specific embodiment of the present disclosure, in the scenario of CA-based PDCP duplication and CU/DU split, when the first node is a central unit (CU), the second node is a distribute unit (DU).

The transceiver configures a PDCP duplication for the bearer according to auxiliary information reported by the second node. The auxiliary information includes at least one of the following: whether the second node supports a carrier aggregation (CA) scenario, whether the second node supports the URLLC service, and situation information of a channel currently supported by the second node.

Further, the notification message carries indication information of configuring the bearer with the PDCP duplication and activation/deactivation of UL PDCP duplication of the bearer.

In another specific embodiment of the present disclosure, according to DC-based PDCP duplication, when the first node is a master node (MN), the second node is a secondary node (SN). The notification message carries indication information of configuring the bearer with the PDCP duplication.

Further, the transceiver is further configured to receive a response message that is transmitted by the second node when the second node determines to activate the UL PDCP duplication of the bearer according to the notification message. The response message carries indication information of activating UL PDCP duplication of the bearer.

This embodiment refers to a device of the first node corresponding to the above method at the first node, and all implementations of the above method at the first node are applicable to this embodiment, and the same technical effects can be achieved.

Figure 6:
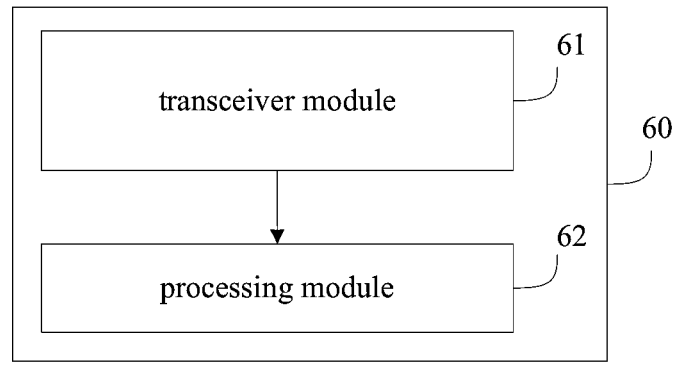
FIG. 6 is a block diagram of a node device according to an embodiment of the present disclosure.

As shown in FIG. 6, one embodiment of the present disclosure further provides a PDCP duplication activation device 60, which is applied to a second node, and includes:

a transceiver module 61 configured to receive a notification message transmitted by a first node when the first node configures a PDCP duplication for a bearer;

a processing module 62 configured to, after receiving the notification message, change or determine an activation or deactivation state of uplink (UL) PDCP duplication of the bearer.

It should be noted that this embodiment refers to a device of the second node corresponding to the above method at the second node, and all implementations of the above method at the second node are applicable to this embodiment, and the same technical effect can be achieved.

One embodiment of the present disclosure further provides a PDCP duplication activation device, which is applied to a first node, and includes:

a transceiver module configured to transmit a notification message to a second node when configuring PDCP duplication for a bearer, so that after the second node receives the notification message, the second node changes or determines an activation or deactivation state of uplink (UL) PDCP duplication of the bearer.

It should be noted that this embodiment refers to a device of the first node corresponding to the above method at the first node, and all implementations of the above method at the first node are applicable to this embodiment, and the same technical effect can be achieved.

One embodiment of the present disclosure further provides a communication device, including:

a processor configured to perform functions of: receiving a notification message transmitted by a first node when the first node configures a PDCP duplication for a bearer; after receiving the notification message, changing or determining an activation or deactivation state of uplink (UL) PDCP duplication of the bearer.

One embodiment of the present disclosure further provides a communication device, including:

a processor configured to perform functions of: transmitting a notification message to a second node when configuring PDCP duplication for a bearer, so that after the second node receives the notification message, the second node changes or determines an activation or deactivation state of uplink (UL) PDCP duplication of the bearer.

One embodiment of the present disclosure further provides a computer storage medium including instructions. The instructions are executed by a computer to cause the computer to perform the above method at the first node or the second node.

In the foregoing embodiment of the present disclosure, the second node receives the notification message transmitted by the first node when the first node configures a PDCP duplication for a bearer; after the second node receives the notification message, the second node changes or determines an activation or deactivation state of uplink (UL) PDCP duplication of the bearer. In the scenario of CA-based PDCP duplication and CU/DU split, when the first node is a central unit (CU), the second node is a distribute unit (DU). The embodiment of the present disclosure teaches how to indicate a current state (i.e., activation or deactivation) of the UL PDCP duplication and subsequent behaviors of the DU when configuring the CA-based PDCP duplication in the CU/DU split scenario. Meanwhile, in the MR-DC scenario, the first node is a master node (MN), and the second node is a secondary node (SN). The embodiment of the present disclosure teaches how to indicate a state of the UL PDCP duplication of the bearer, i.e., activated or deactivated, and subsequent behaviors of the SN, when configuring the DC-based PDCP duplication.

Persons having ordinary skill in the art may obtain that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

In addition, it should be noted that in the devices and methods of the present disclosure, apparently, each component or each step may be decomposed and/or recombined. These decomposition and/or recombination should be regarded as equivalent solutions of the present disclosure. In addition, the steps of performing the above series of processing may be performed naturally in chronological order in the order of description, but do not necessarily need to be performed in chronological order, and some steps may be performed in parallel or independently of each other. Those of ordinary skill in the art can understand that all or any of the steps or components of the method and device of the present disclosure may be implemented in hardware, firmware, software or a combination thereof in any computing device (including processor, storage medium, etc.) or network of computing devices, which can be achieved by those of ordinary skill in the art with their basic programming skills after reading the description of the present disclosure.

Therefore, the object of the present disclosure may also be achieved by running a program or a set of programs on any computing device. The computing device may be a well-known universal device. Therefore, the object of the present disclosure may also be achieved only by providing a program product containing program codes for implementing the method or device. In other words, such a program product also constitutes the present disclosure, and a storage medium storing such a program product also constitutes the present disclosure. Apparently, the storage medium may be any known storage medium or any storage medium developed in the future. It should also be noted that in the devices and methods of the present disclosure, apparently, each component or each step may be decomposed and/or recombined. These decomposition and/or recombination should be regarded as equivalent solutions of the present disclosure. In addition, the steps of performing the above series of processing may be performed naturally in chronological order in the order of description, but do not necessarily need to be performed in chronological order, and some steps may be performed in parallel or independently of each other.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A method for activating a packet data convergence protocol (PDCP) duplication, comprising:
   receiving, by a second node, a notification message transmitted by a first node, wherein the notification message is configured to configure a PDCP duplication for a bearer; wherein the notification message is configured to notify that the PDCP duplication is activated or deactivated;
   after the second node receives the notification message, changing or determining, by the second node, an activation or deactivation state of uplink (UL) PDCP duplication of the bearer;
   wherein
   for carrier aggregation (CA) based PDCP duplication, in a central unit (CU)/distribute unit (DU) split scenario, when the first node is the CU, the second node is the DU; or,
   for double connection (DC) based PDCP duplication, when the first node is a master node (MN), the second node is a secondary node (SN).

2. The method according to claim 1, wherein the notification message carries indication information of configuring the bearer with the PDCP duplication and activation/deactivation of UL PDCP duplication of the bearer.

3. The method according to claim 2, wherein after the second node receives the notification message, changing or determining, by the second node, an activation or deactivation state of uplink (UL) PDCP duplication of the bearer, includes:
   after the second node receives the indication information of activation/deactivation of UL PDCP duplication of the bearer carried in the notification message, changing, by the second node, an activation/deactivation state of UL PDCP duplication of the bearer.

4. The method according to claim 3, wherein the changing, by the second node, an activation/deactivation state of UL PDCP duplication of the bearer, includes:
changing, by the second node, an activation/deactivation state of UL of the bearer through medium access control control unit (MAC CE) signaling.

5. The method according to claim 4, wherein after the second node receives the indication information of activation of UL PDCP duplication of the bearer carried in the notification message, or after the second node changes the deactivation state of UL of the bearer to be the activation state, the method further includes:
providing, by the second node, a service of a corresponding priority to the bearer, according to the activation state of UL of the bearer.

6. The method according to claim 1, wherein the notification message carries indication information of configuring the bearer with the PDCP duplication;
wherein after the second node receives the notification message, determining, by the second node, an activation or deactivation state of uplink (UL) PDCP duplication of the bearer, includes:
after the second node receives the notification message, when determining to activate UL PDCP duplication of the bearer, transmitting, by the second node, a response message to the first node; wherein the response message carries indication information of activating UL PDCP duplication of the bearer.

7. A method for activating a packet data convergence protocol (PDCP) duplication, comprising:
transmitting, by a first node, a notification message to a second node, wherein the notification message is configured to configure a PDCP duplication for a bearer, so that after the second node receives the notification message, the second node changes or determines an activation or deactivation state of uplink (UL) PDCP duplication of the bearer; wherein the notification message is configured to notify that the PDCP duplication is activated or deactivated;
wherein
for carrier aggregation (CA) based PDCP duplication, in a central unit (CU)/distribute unit (DU) split scenario, when the first node is the CU, the second node is the DU; or,
for double connection (DC) based PDCP duplication, when the first node is a master node (MN), the second node is a secondary node (SN).

8. The method according to claim 7, wherein the first node configures PDCP duplication for the bearer according to auxiliary information reported by the second node;
wherein the auxiliary information includes at least one of the following: whether the second node supports a carrier aggregation (CA) scenario, whether the second node supports an ultra-reliable low latency communication (URLLC) service, and situation information of a channel currently supported by the second node.

9. The method according to claim 7, wherein the notification message carries indication information of configuring the bearer with the PDCP duplication and activation/deactivation of UL PDCP duplication of the bearer.

10. The method according to claim 7, wherein the notification message carries indication information of configuring the bearer with the PDCP duplication;
after the transmitting, by a first node, a notification message to a second node, the method further includes:
receiving a response message that is transmitted by the second node when the second node determines to activate UL PDCP duplication of the bearer according to the notification message; wherein the response message carries indication information of activating UL PDCP duplication of the bearer.

11. A node device, comprising:
a transceiver, a memory, a processor, and a computer program stored on the memory and executable on the processor;
wherein the transceiver is configured to receive a notification message transmitted by a first node, wherein the notification message is configured to configure a PDCP duplication for a bearer; wherein the notification message is configured to notify that the PDCP duplication is activated or deactivated;
the processor is configured to, after receiving the notification message, change or determine an activation or deactivation state of uplink (UL) PDCP duplication of the bearer;
wherein
for carrier aggregation (CA) based PDCP duplication, in a central unit (CU)/distribute unit (DU) split scenario, when the first node is the CU, the second node is the DU; or,
for double connection (DC) based PDCP duplication, when the first node is a master node (MN), the second node is a secondary node (SN).

12. The node device according to claim 11, wherein the notification message carries indication information of configuring the bearer with the PDCP duplication and activation/deactivation of UL PDCP duplication of the bearer;
after the transceiver receives the indication information of activation/deactivation of UL PDCP duplication of the bearer carried in the notification message, the processor changes an activation/deactivation state of UL PDCP duplication of the bearer;
the transceiver is further configured to change an activation/deactivation state of UL of the bearer through medium access control control unit (MAC CE) signaling;
the processor is further configured to provide a service of a corresponding priority to the bearer, according to the activation state of UL of the bearer.

13. The node device according to claim 11, wherein the notification message carries indication information of configuring the bearer with the PDCP duplication;
after receiving the notification message, when the transceiver determines to activate UL PDCP duplication of the bearer, the transceiver transmits a response message to the first node; wherein the response message carries indication information of activating UL PDCP duplication of the bearer.

14. A node device, comprising:
a transceiver, a memory, a processor, and a computer program stored on the memory and executable on the processor;
wherein the transceiver is configured to transmit a notification message to a second node, wherein the notification message is configured to configure a PDCP duplication for a bearer, so that after the second node receives the notification message, the second node changes or determines an activation or deactivation state of uplink (UL) PDCP duplication of the bearer;

wherein the notification message is configured to notify that the PDCP duplication is activated or deactivated;
wherein
for carrier aggregation (CA) based PDCP duplication, in a central unit (CU)/distribute unit (DU) split scenario, when the first node is the CU, the second node is the DU; or,
for double connection (DC) based PDCP duplication, when the first node is a master node (MN), the second node is a secondary node (SN).

15. The node device according to claim 14, wherein the transceiver configures PDCP duplication for the bearer according to auxiliary information reported by the second node;
wherein the auxiliary information includes at least one of the following: whether the second node supports a carrier aggregation (CA) scenario, whether the second node supports an ultra-reliable low latency communication (URLLC) service, and situation information of a channel currently supported by the second node.

16. The node device according to claim 14, wherein the notification message carries indication information of configuring the bearer with the PDCP duplication and activation/deactivation of UL PDCP duplication of the bearer.

17. The node device according to claim 14, wherein the notification message carries indication information of configuring the bearer with the PDCP duplication;
the transceiver is further configured to receive a response message that is transmitted by the second node when the second node determines to activate the UL PDCP duplication of the bearer according to the notification message; wherein the response message carries indication information of activating UL PDCP duplication of the bearer.

\* \* \* \* \*